UNITED STATES PATENT OFFICE.

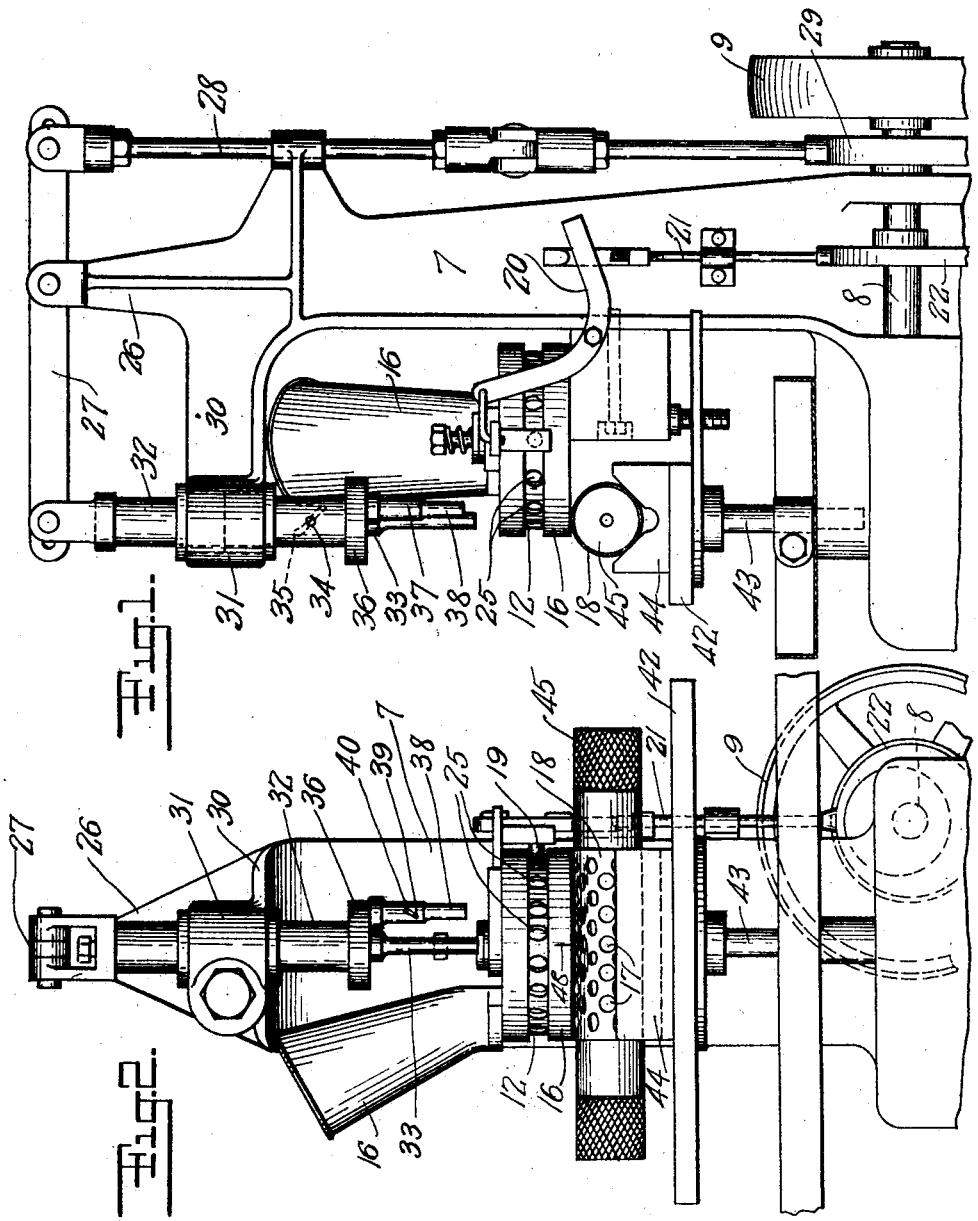

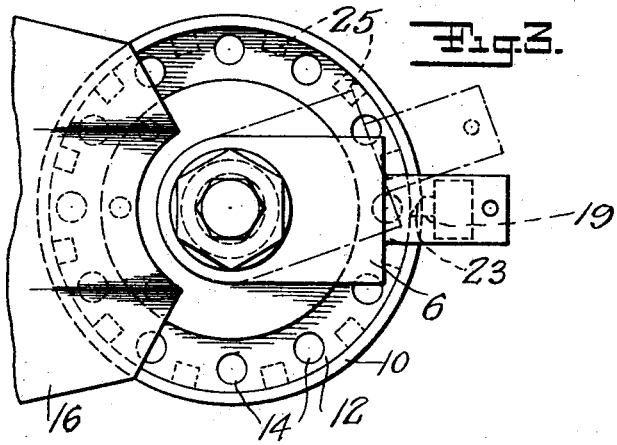
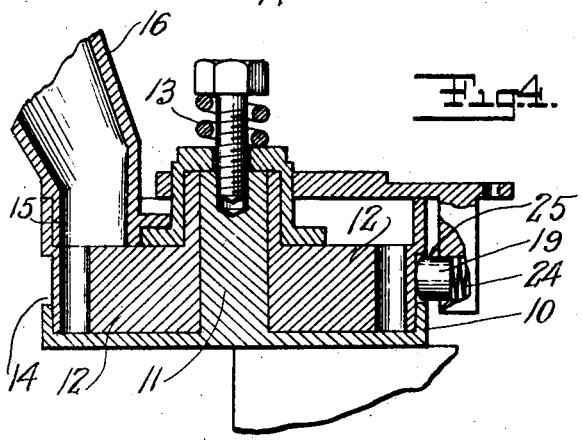
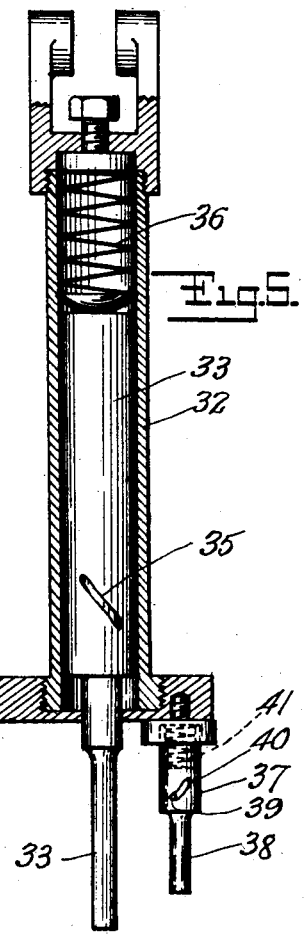
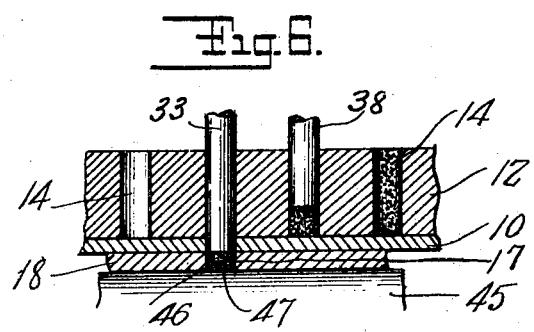

LEONARD BARTLETT, OF BOSTON, MASSACHUSETTS, ASSIGNOR TO RELIANCE MACHINE & SPECIALTY CO., OF BOSTON, MASSACHUSETTS, A CORPORATION OF MASSACHUSETTS.

BEARING-FILLING MACHINE.

1,396,089.    Specification of Letters Patent.    Patented Nov. 8, 1921.

Application filed July 28, 1920. Serial No. 399,575.

*To all whom it may concern:*

Be it known that I, LEONARD BARTLETT, a citizen of the United States, residing at Boston, (Jamaica Plain,) in the county of Suffolk and State of Massachusetts, have invented a new and useful Bearing-Filling Machine, of which the following is a specification.

This invention relates to machines for filling perforations in bearings with lubricating material; and the objects of the invention are: 1st. to provide an automatic lubricating feeding device; and, 2nd. to provide special means for packing the lubricating material in the perforations of the bearing.

The invention is illustrated in the accompanying drawings, in which—

Figure 1, is an elevation of a part of a bearing filling machine, constructed in accordance with my invention;

Fig. 2, is a similar view—taken at right angles to Fig. 1;

Fig. 3, is a plan view of a part of the feeding mechanism;

Fig. 4, is a sectional elevation of the same;

Fig. 5, is a sectional elevation of a part of the packing mechanism—a part being shown in full lines; and, Fig. 6, is a sectional view, on the line 6—6 of Fig. 3.

In the drawings, like numerals of reference refer to the same parts in each of the views.

In practice I provide a bearing filling machine comprising a suitable frame 7, adapted to support a rotatable shaft 8 operable through a belt pulley 9, or in any desired manner.

The frame 7 carries a fixed, flanged disk 10, having a central stud 11, on which is rotatably mounted a carrier 12 which is made to fit within the flange of the disk 10, as clearly shown in Fig. 4; and this carrier is made of a thickness corresponding with the thickness of the wall of the bearing, for reasons hereinafter described, and is held elastically on the flanged disk 10 with a spring 13, as clearly shown in Fig. 4. The carrier is provided with a plurality of vertical perforations 14, adapted to register successively with the perforation 15, in the bottom of the receptacle 16, adapted to hold the lubricating material before the same is packed in one of the perforations 17, in a bearing 18; and the carrier 12 is rotated with a pawl 19, operable with a crank lever 20, thrust shaft 21, and cam 22, as will be understood. As shown, the pawl 19 is provided with a beveled face 23, and is controlled with a spring 24, so that when drawn backward the pawl will be forced out of the respective pocket 25 by reason of the beveled face 23, and will enter the succeeding pocket 25, whereby the carrier may be rotated one step by the lever 20, as will be understood.

The frame 7 is provided with a standard 26, carrying a rocking arm 27, operable through a shaft 28, and cam 29; and the frame 7 is also provided with an arm 30, having a head 31, in which is mounted a tubular shaft 32 (shown in detail in Fig. 5), carrying a plunger 33, in which is formed a slot 35 adapted to receive the inner end of the pin 34, mounted in the tubular shaft 32, so that as the plunger 33 rises in said tubular shaft against the action of the spring 36 it will be partly rotated, as will be clear. The tubular shaft 32 carries a head 36, with a tubular part 37, in which is mounted a plunger 38, provided with a pin 39, movable in a slot 40; and the plunger 38 is movable in an upward direction against the action of a spring 41, in a manner similar to the action of the plunger 33 against the action of the spring 36.

The machine is also provided with a platform 42, mounted on an adjustable shaft 43, and on which may be mounted a V-block 44 adapted to support a bearing 18,—mounted on a mandrel 45, of a size to fit the bearing 18, whereby a bottom is formed for each perforation 17 in the bearing thereby forming a pocket in which the bearing material can be packed as will be understood. The mandrel also serves ready means for rotating the bearing to bring the perforations 17 successively under the perforation 46 in the disk 10, for the passage of the lubricating plug 47. The flange of the disk 10 is also preferably provided with an indicating line 48, for the location of the proper perforation 17 in the bearing under the perforation 46 in the disk 10.

In operation the bearing is mounted on a suitable mandrel and placed in proper position under the carrier; the receptacle is filled with suitable lubricating material; and the machine is started to run. As the carrier is rotated with the lever 20 step by step, the perforations 14 are brought successively under the perforation 15 in the bottom of the receptacle 16, and are filled with lubricating material. The receptacle 16 extends close enough to the carrier to form a sweep so that only the right amount of material will be carried in each perforation 14, proportional to the thickness of the carrier as described above. When the carrier has rotated to bring one of the perforations 14, as shown in Fig. 6, under the plunger 38, this plunger will descend a sufficient distance to pack the material against the bottom of the support, or disk 10 so that when the carrier is advanced another step the material will be packed sufficiently to prevent it dropping through the perforation 46 in the disk. At the next step the compressed plug is brought over the perforation 46; and at this time the bearing has been rotated by the operator, and so placed, guided by the mark 48, that one of the perforations 17 in the bearing 18 will be directly beneath the perforation 46, when the plunger 33, in descending, will drive the plug through the perforation 46, and pack the same in the perforation 17 beneath the perforation 46.

As the plunger 33 descends into contact with the plug 47 of lubricating material it is forced upward against the action of the spring 36, and will be given a partial rotation by reason of the pin 34 traveling up the slot 35, as will be understood. This action will serve to pack the plug 47 more firmly in the perforation 17, as will be understood; and the mandrel assists in the packing by reason of the fact that the plug can not be pushed through the perforation 17 in the bearing, as will be understood.

In the same way the plunger 38 is forced upward by the lubricating material in the perforation 14, against the action of the spring 41, and is partially rotated by reason of the pin 39, and slot 40, as will be understood. This rotation not only serves the purpose of packing the plug 47 of lubricating material more firmly; but as the lubricating material is usually in the form of a powder before packing, the partial rotation also serves to clear the plunger 38 of any adhering powder, as will be understood.

By packing the powder with the plunger 38 before it is brought over the perforation 46 in the disk 10, it will not fall through, as would be the case if there was loose powder in the perforation 14 when it was brought into register with the perforation 46, thereby eliminating the necessity for such a close fit between the bearing and the bottom of the disk 10 that there would be considerable friction between the disk and bearing to overcome in rotating the bearing. Then, too, as the bearing is round, and frequently of such limited diameter that the powder is liable to sift from each side of the perforation, the formation of the lubricating material into a plug prior to the registration of the two perforations is a very desirable feature.

It will thus be seen that I have provided an automatic bearing filling machine that is comparatively cheap to manufacture, simple in construction, and efficient in use.

I claim:

1. A bearing filling machine comprising, means to hold a perforated bearing, a receptacle adapted to hold lubricating material, a carrier provided with pockets adapted to hold lubricating material, and means to move the pockets in said carrier from said receptacle to said bearing-holding means whereby lubricating material is conveyed from said receptacle to the perforated bearing mounted in said holding means.

2. In a bearing filling machine, means to hold a bearing, a receptacle adapted to hold lubricating material, a perforated carrier, and means to move the perforated part of said carrier to said bearing-holding means from said receptacle whereby lubricating material is conveyed from said receptacle to a bearing mounted in said holding means.

3. In a bearing filling machine, means to hold a bearing, a receptacle adapted to hold lubricating material, a perforated carrier, means to pack lubricating material in the perforations in said carrier successively, and means to move the packed material to a bearing mounted in said holding means.

4. In a bearing filling machine, means to hold a bearing, a receptacle adapted to hold lubricating material, a carrier provided with perforations adapted to receive lubricating material from said receptacle, means to pack the lubricating material successively in said perforations, means to give a rotary movement to said packing means, and means to convey the packed lubricating material to a bearing mounted in said holding means.

5. In a bearing filling machine, means to hold a perforated bearing, a receptacle adapted to hold lubricating material, a perforated carrier adapted to convey lubricating material in the perforations thereof from the receptacle to a bearing mounted in said holding means, means to pack the lubricating material successively in the perforations of said carrier, and means to drive the packed lubricating material from said carrier into a perforation in the bearing.

6. In a bearing filling machine, means to hold a perforated bearing, a receptacle adapted to hold lubricating material, a carrier provided with perforations adapted to receive lubricating material successively from said receptacle, means to pack the lubricating material successively in said perforations, means to give a rotary movement to said packing means, means to convey the packed lubricating material to a perforated bearing mounted in said holding means, and means to drive the packed lubricating material from said carrier into a perforation in said bearing.

7. In a bearing filling machine, means to hold a perforated bearing, a receptacle adapted to hold lubricating material, a carrier provided with perforations adapted to receive lubricating material from said receptacle, means to pack the lubricating material successively in said perforations, means to give a rotary movement to said packing means, means to convey the packed lubricating material to a perforated bearing, means to drive the packed lubricating material from said carrier into a perforation in said bearing, and means to give a rotary movement to said driving means whereby the packed material is packed more firmly in one of the perforations of the bearing.

8. A bearing filling machine comprising, a receptacle adapted to hold lubricating material, a holder adapted to hold a perforated bearing, a rotary carrier adapted to convey lubricating material from said receptacle to a perforated bearing mounted in said holder, and means to rotate said carrier, said carrier being provided with a plurality of perforations adapted to receive the lubricating material, and being of a predetermined thickness whereby the amount of lubricating material fed to each perforation of the bearing is measured.

9. A bearing filling machine, a receptacle adapted to hold lubricating material, a bearing holder carrying a bearing provided with a plurality of perforations adapted to receive the bearing material, a rotatable carrier provided with perforations adapted to convey said material from said receptacle to the perforations in the bearing, means to pack the material in the perforations in the bearing, and means to measure the length of the packed material.

10. A bearing filling machine comprising a lubricating receptacle, a carrier, a holder adapted to hold a perforated bearing, a plunger adapted to pack the bearing material in perforations in the bearing, means to operate the carrier, and an indicating mark on the machine adapted to assist an operator in the location of the perforations in the bearing.

11. In a bearing filling machine of the character set forth in claim 9, mechanism adapted to advance the rotatable carrier step by step from the lubricating receptacle to the perforated bearing mounted in the holder whereby lubricating material is fed from the receptacle to the perforations in the bearing.

12. In a perforated bearing filling machine, means to hold a bearing, a receptacle adapted to hold lubricating material, a perforated rotary carrier mounted in close contact with said receptacle whereby the receptacle acts as a sweep, means to feed lubricating material from the receptacle to the perforations in said carrier, and means to advance the perforations in said carrier step by step over the perforations in the bearing mounted in said holding means whereby lubricating material is conveyed from said receptacle to the perforations in the bearing.

Dated this 21st day of July, 1920.

LEONARD BARTLETT.